March 27, 1962 W. B. WESTCOTT, JR 3,027,122
AIRCRAFT LANDING GEAR
Filed March 24, 1959 3 Sheets-Sheet 1
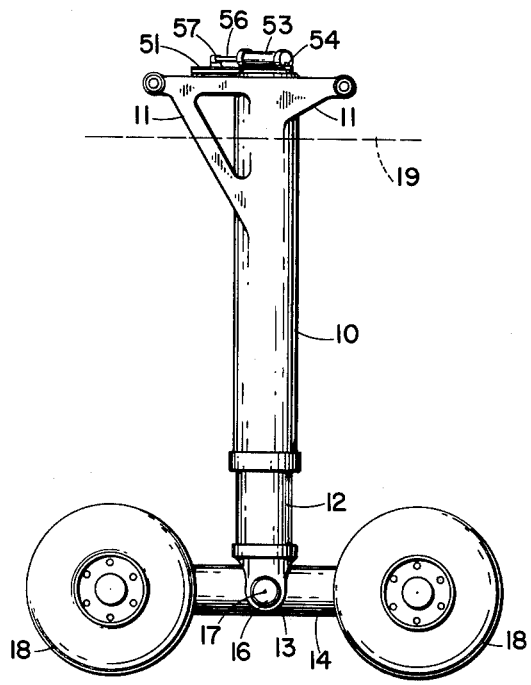
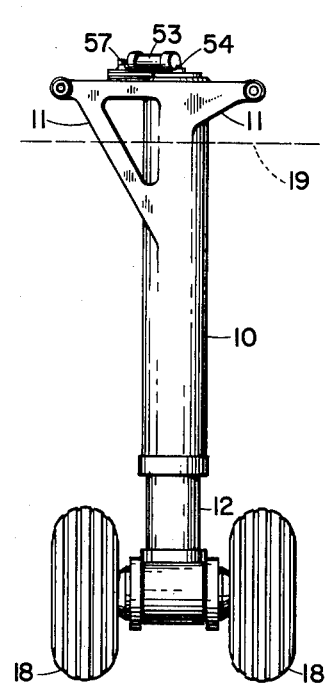
FIG. 1    FIG. 2
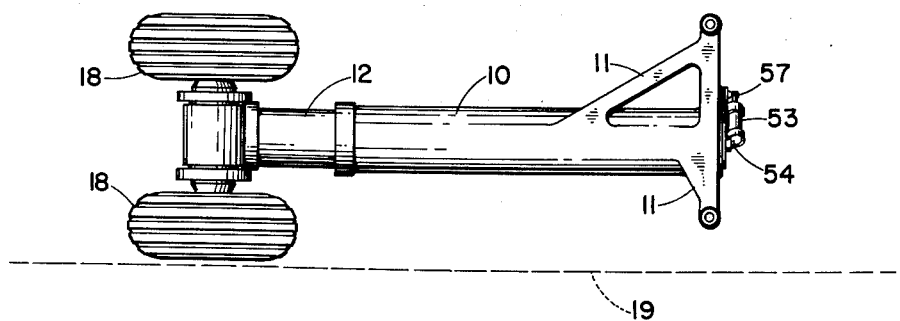
FIG. 3
INVENTOR.
WILLIAM B. WESTCOTT, JR.
BY
ATTORNEY

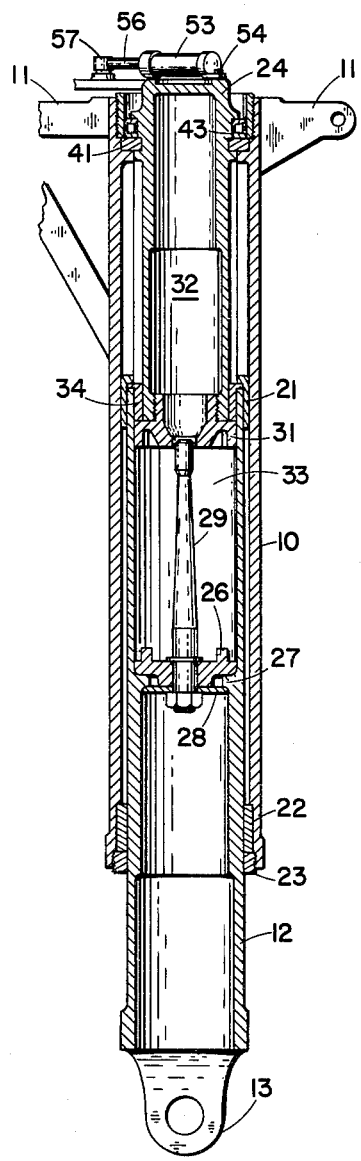
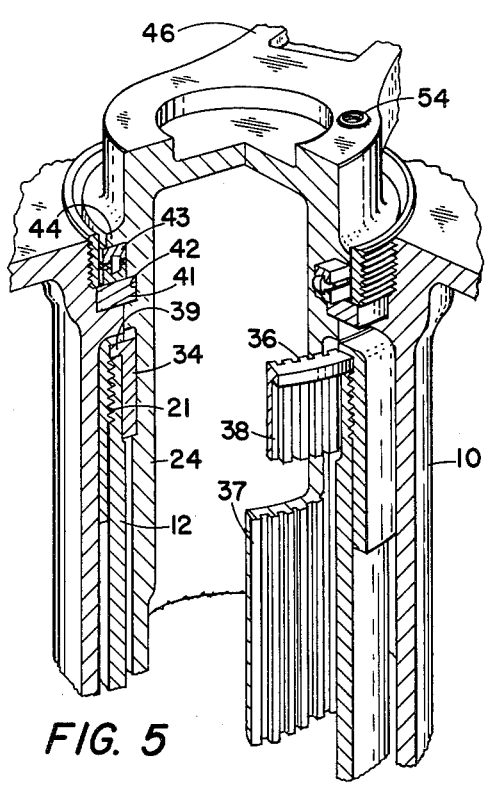
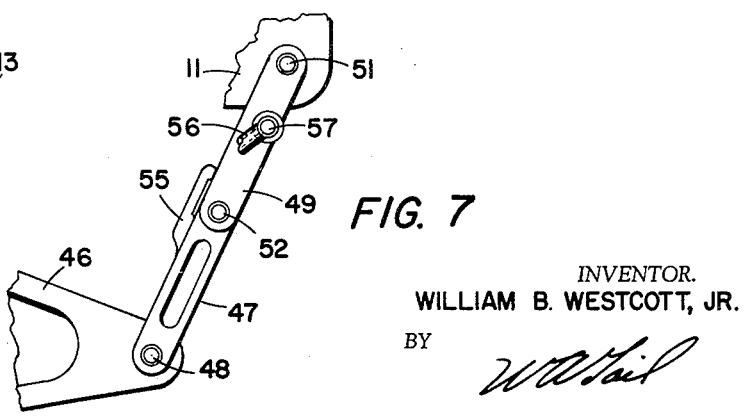

March 27, 1962 W. B. WESTCOTT, JR 3,027,122
AIRCRAFT LANDING GEAR
Filed March 24, 1959 3 Sheets-Sheet 3

INVENTOR.
WILLIAM B. WESTCOTT, JR.
BY

ATTORNEY

_United States Patent Office_ 3,027,122
Patented Mar. 27, 1962

3,027,122
AIRCRAFT LANDING GEAR
William B. Westcott, Jr., Cleveland Heights, Ohio, assignor to Cleveland Pneumatic Industries, Inc., Cleveland, Ohio, a corporation of Ohio
Filed Mar. 24, 1959, Ser. No. 801,663
10 Claims. (Cl. 244—103)

This invention relates to aircraft landing gears and more particularly to a new and improved landing gear incorporating means for rotating the landing wheels about the longitudinal axis of the shock strut.

It is an important object of this invention to provide a new and improved landing gear incorporating means for rotating the landing gear about its axis to reduce the storage space requirement when the landing gear is retracted.

It is another important object of this invention to provide a landing gear including two telescoping members, one of which is fixed against rotation around its longitudinal axis and another which is provided with power means by which it can be rotated around the longitudinal axis of the structure through a limited range.

It is another important object of this invention to provide a strut rotation mechanism which operates to rotate the aircraft landing gear between two positions and automatically lock them in each position.

It is still another object of this invention to provide a landing gear rotation mechanism which utilizes fixed stops to absorb the large strains produced by tire scuffing and the toggle linkage to absorb the lesser strains.

Further objects and advantages will appear from the following description and drawings, wherein:

FIGURE 1 is a side elevation showing the preferred landing gear according to this invention in the fully extended position when it is in condition to support the weight of the aircraft;

FIGURE 2 is a view showing the landing gear after the strut piston and wheels have been rotated through substantially 90°;

FIGURE 3 is a view similar to FIGURES 1 and 2 showing the position of the landing gear when it is in the retracted position;

FIGURE 4 is a longitudinal section of the shock strut in the extended position with parts removed for purposes of simplicity;

FIGURE 5 is a fragmentary perspective view showing the structural details of the spline connection between the strut piston and the plunger tube with the shock strut shown in a retracted position;

FIGURE 7 is an enlarged fragmentary view of the toggle links of the rotation mechanism;

Figure 6A:
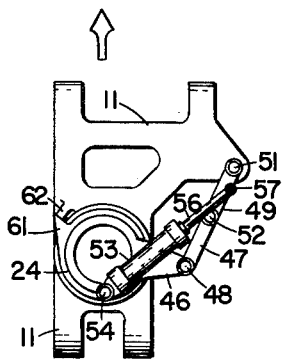
FIGURE 6A is a plan view showing the position the rotation actuator and toggle assumes when the landing gear is in a normal landing condition.

In the modern high speed aircraft, it is often necessary to retract the landing gear into a storage envelope within the aircraft frame which is very small. This is particularly true if the landing gear is retracted into the wings because the wings of high speed aircraft are thin and provide a narrow storage space. A landing gear according to this invention is provided with means for rotating the strut piston around the longitudinal axis of the shock strut and thereby rotate the landing wheels to a position wherein they can be stored within the thin envelope of the type provided in the aircraft wing or the like.

The preferred landing gear according to this invention includes a strut cylinder 10 formed with mounting arms 11 projecting from its upper end. These arms provide the connection points for attaching the landing gear to the aircraft frame. Telescoping into the lower end of the strut cylinder 10 is a strut piston 12 which co-operates with the cylinder 10 to form a fluid spring and damping shock strut to resiliently support the weight of the aircraft when it is on the ground. The lower end of the strut piston 12 is formed with a clevis 13 which is proportioned to extend on opposite sides of an axle beam 14. The axle beam 14 is connected to the clevis 13 by a cross pin 16 so that the axle beam can rotate relative to the strut piston 12 about a pivot axis 17 but is prevented from rotating relative to the strut piston around the longitudinal axis of the shock strut. Journalled on opposite ends of the axle beam 14 are dual tandem landing wheels 18. When the landing gear is in the position shown in FIGURE 1, the axle beam 14 extends in a direction parallel to the main axis of the aircraft and the landing wheels are positioned below the lower surface of the aircraft frame illustrated schematically by the dotted line 19.

A landing gear which includes a truck or axle beam structure presents a problem when it is retracted since considerable space must be consumed within the aircraft frame for the storage of the truck structure. In the landing gear according to this invention, the strut piston 12 and the axle beam 14 are rotated through substantially 90° around the longitudinal axis of the strut cylinder 10 prior to retraction as shown in FIGURE 2. After the strut is rotated about its longitudinal axis by the mechanism described below, it is retracted to the position of FIGURE 3 at which time the wheels 18 are above the lower surface of the frame 19 as shown in FIGURE 3. The actuating mechanism used to retract the landing mechanism from the position of FIGURE 2 to the position of FIGURE 3 is conventional in nature and therefore has not been shown.

Referring to FIGURES 4 and 5, the strut piston 12 is supported for axial movement within the strut cylinder 10 on spaced bearings 21 and 22. The upper bearing 21 is threaded onto the upper end of the strut piston 12 and slides along the inner wall of the strut cylinder 10. The lower bearing 22 is mounted on the lower end of the strut cylinder 10 by a gland nut 23. An externally splined plunger tube or torque element 24 is mounted for rotation in, and closes, the upper end of the strut cylinder 10. A bulkhead 26 is positioned against a shoulder 27 in the strut piston 12 by a bulkhead ring 28. Mounted on the bulkhead 26 is a metering pin 29 which projects into the inner end of the plunger tube 24. An orifice plate 31 mounted on the lower end of the plunger tube 24 is formed with a centrally located orifice through which the metering pin 29 projects.

The strut piston 12 and strut cylinder 10, in co-operation with the bulkhead 26 and the plunger tube 24, co-operate to define a fluid-tight cavity which contains oil and compressed air. This cavity is divided into an upper chamber 32 and a lower chamber 33 by the orifice plate 31. When the landing gear is in the extended position, oil fills the lower chamber 33 and the lower portion of the upper chamber 32 and the remainder of the upper chamber is filled with compressed air. As the strut is compressed, oil is forced through the orifice plate 31 and around the metering pin 29 to provide damping to resist such compression. The resistance to flow is regulated by the metering pin 29 to provide the desired damping characteristics.

A spline block 34 mounts on the head end of the strut piston 12 and is formed with an internal spline 36 (best shown in FIGURE 5) axially movable along an external spline 37 formed in the plunger tube 24. The spline block 34 is also formed with an external spline 38 which intermeshes with a short internal spline on the strut piston 12 preventing rotation between these two components. Axial movement between the spline block 34 and strut piston 12 is prevented by a radially extending shoulder 39 on the spline block 34 which is positioned between the end of the strut piston 12 and the piston head bearing 21. This structure permits relative axial movement between the strut piston 12 and the plunger tube 24 but prevents relative rotation therebetween.

The plunger tube 24 is mounted within the strut cylinder 10 so that it can be rotated between two positions and locked in each position. A split thrust ring 41 extends into an annular groove 42 formed in the plunger tube 24 by the pressurized fluid when the strut piston 12 is partially compressed and spaced from the extended position. Since the plunger tube 24 is never rotated when the strut is partially compressed and supporting the weight of the aircraft, antifriction bearings are not needed between the lower side of the thrust ring 41 and the plunger tube 24.

The plunger tube 24 and strut piston 12 are rotated relative to the strut cylinder 10 during retraction and extension of the landing gear. This occurs only when the aircraft is airborne and the strut piston 12 is in the fully extended position. With the strut piston fully extended, the spline block 34 engages the orifice plate 31 so that the plunger tube 24 suports the strut piston 12 and the axle beam assembly. Under these conditions, there is a net force urging the plunger tube 24 into the strut cylinder 10. This force is resisted by an antifriction bearing 43 positioned between the split thrust ring 41 and a shoulder 44 formed on the plunger tube 24. Since the axial load on the plunger tube 24 is supported by the antifriction bearings 43 when the strut piston 12 is fully extended, rotation of the plunger tube 24 and the strut piston 12 relative to the strut cylinder 10 is easily accomplished. Since the plunger tube 24 is not subjected to any lateral loads, the spline connection operating between the strut piston 12 and the plunger tube 24 is not subjected to lateral loads and the possibility of jamming the spline is eliminated.

Figure 6B:
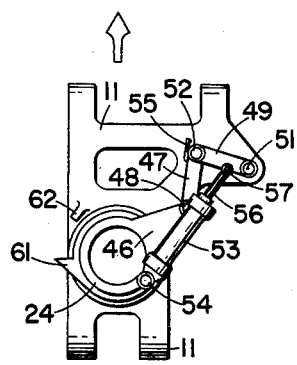
FIGURE 6B is a view similar to FIGURE 6A illustrating the strut rotation mechanism in an intermediate position of rotation.
Figure 6C:
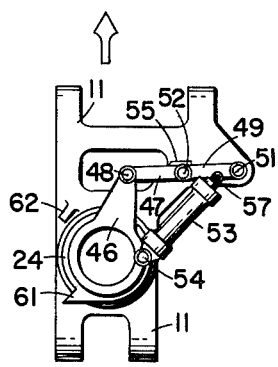
FIGURE 6C is a view similar to FIGURES 6A and 6B showing the position the elements assume when the strut has been rotated to the position for retraction.

A rotation actuator and toggle linkage assembly, best illustrated in FIGURES 6A through 7, is provided to rotate the plunger tube 24 and in turn the strut piston 12 and axle beam 14. This assembly moves the forward end of the axle beam 14 outboard relative to the aircraft's longitudinal axis 50 through approximately 90° prior to retraction of the landing gear and operates to rotate the axle beam in the opposite direction after extension of the landing gear prior to landing of the aircraft. The plunger tube 24 is formed with a laterally extending arm 46 on which is pivotally connected a first link 47 for rotation relative thereto about a pivot axis 48. A second link 49 is pivotally connected to the mounting arm 11 for rotation relative thereto about a pivot axis 51 and is pivotally connected to the first link 47 for relative rotation about a pivot axis 52. These two links co-operate to form a toggle linkage used to rotate the plunger tube 24 between the normal forward position of FIGURE 6A and the rotated position of FIGURE 6C. To operate the toggle linkage, an actuator is used which includes an actuator cylinder 53 pivoted on the plunger tube 24 at 54 and a co-operating piston 56 pivoted on the second link 49 at 57. When the plunger tube 24 is in either of its extreme positions shown in FIGURES 6A through 6C, the two links 47 and 49 are aligned with each other an in an overcenter locked position. A stop 55 formed on the first link 47 engages the second link 49 when the toggle is overcenter and limits relative rotation between the link in one direction. The various proportions are arranged so that rotation from the position of FIGURE 6A to the position of FIGURE 6C is accomplished by pressurizing the actuator cylinder 53 to retract the actuator piston 56 into the cylinder. This produces a turning moment on the plunger tube 24 and a force which folds the two links 47 and 49 through the position shown in FIGURE 6B. As the plunger tube 24 moves to the position of FIGURE 6C, the compressing movement of the piston 56 returns the two links 47 and 49 to the aligned overcenter position. Any force tending to rotate the plunger tube in a direction tending to fold the links 47 and 49 merely causes an increased force of engagement on the stop 55 so the plunger tube 24 is locked in either position by the toggle.

To return the plunger tube 24 from the position of FIGURE 6C back to the position of FIGURE 6A, the actuator cylinder 53 is pressurized in a manner which causes extension of the piston 56. This operates to apply a turning moment to the plunger tube 24 and also unlocks the two links 47 and 49 of the toggle. As the mechanism approaches the position of FIGURE 6A, the extension of the piston 56 automatically returns the two links 47 and 49 to the overcenter locked position.

Figure 8A:
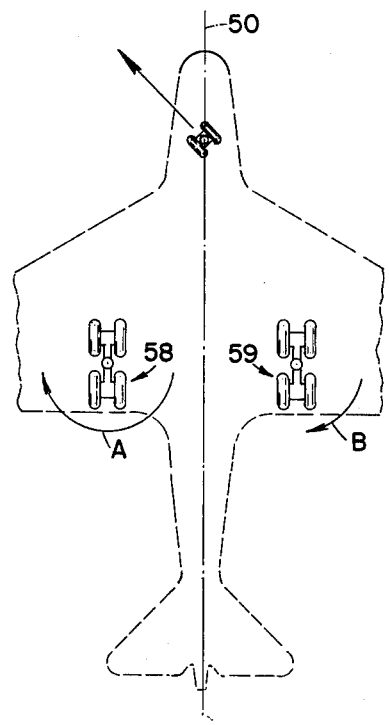
FIGURE 8A is a schematic plan view illustrating the forces created on the landing gear when an aircraft turns to the left.
Figure 8B:
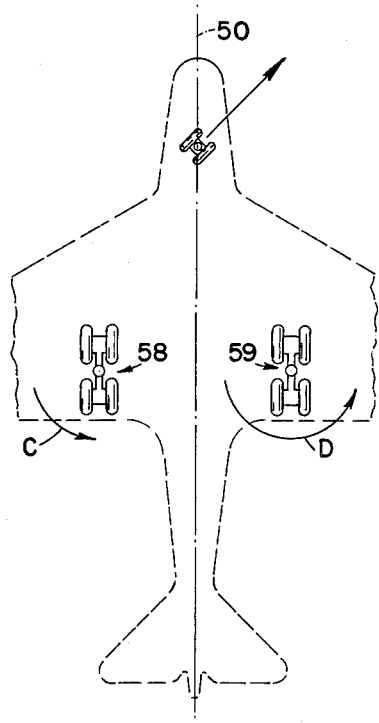
FIGURE 8B is a view similar to FIGURE 8A illustrating the force condition when the aircraft is turning to the right.

During the ground maneuvering of the aircraft, the main landing gear tires will be scuffed sideways in order to change their direction. This lateral scuffing of the tires produces force couples which attempt rotation between the plunger tube 24 and the strut cylinder 10. A locking mechanism operating between these two parts must overcome these force couples. FIGURES 8A and 8B provide two views which schematically show aircraft turns. As the aircraft is turned to the left, as shown in FIGURE 8A, it pivots about the left-hand main landing gear 58 and the right-hand main landing gear 59 rolls around a radius. Conversely, the same principal applies when the aircraft turns to the right as shown in FIGURE 8B. The magnitude in the direction of the force couple created by the turning of the aircraft in either direction is indicated by the arrows A, B, C, and D. The force couple illustrated by the arrow A tends to produce clockwise rotation of the left-hand landing gear with a magnitude which is approximately three times as great as the clockwise force couple indicated by the arrow B applied to the right-hand landing gear. This is due to the rolling movement of the right-hand landing gear wheels which appreciably reduce scuffing. The reverse condition takes place during the right-hand turn.

An analysis of FIGURES 8A and 8B indicates that the large magnitude force couple indicated by the arrows A and D applied to each landing gear tends to rotate the respective landing gear in a direction which would move the forward wheels inboard toward the longitudinal axis 50. In the left-hand main landing gear 58, interengaging stops 61 and 62 on the plunger tube 24 and strut cylinder 10 prevent clockwise rotation of the plunger tube beyond the forward position. These fixed stops 61 and 62, best illustrated in FIGURES 6A through 6C, absorb the large clockwise force couple A produced on the left-hand main landing gear while the force couple, indicated by the arrow C in FIGURE 8B, is resisted by the locking toggle linkage. The right-hand main landing gear is a mirror structure and the same principle applies in that the large force couple D is absorbed by fixed stops and the smaller force couple B is absorbed by the toggle linkage.

The stop 61 is integrally formed on the upper end of the plunger tube 24 and the stop 62 is formed on the upper end of the strut cylinder 10 and are proportioned to engage only when the landing gear is in the forward position of FIGURE 6A. The use of the fixed stop structure to absorb the large magnitude force couple in each case permits a substantial reduction in the size and weight of the toggle linkage since it provides the lock only against the smaller couples B and C. By utilizing the simple actuator and toggle linkage assembly, a lightweight, durable strut rotation device is provided. In addition, this mechanism, in co-operation with the splined connection between the plunger tube 24 and the strut piston 12, eliminates the need of torque arms and the like which are normally external of the strut and take up room.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. An aircraft landing gear comprising first and second telescoping members axially movable and rotatable relative to each other, said members cooperating to confine fluid under pressure operating to urge said members axially apart, said first member being adapted to be connected to an aircraft, landing wheels operatively connected to said second member, a torque element disposed within said first member and axially fixed and rotatable on said first member, a connection between said torque element and second member permitting relative axial movement and preventing relative rotation therebetween, and actuator means connected between said first member and torque element operable to rotate said torque element between two positions including means to lock said torque element in each of said positions.

2. An aircraft landing gear comprising first and second telescoping members axially movable and rotatable relative to each other, said members cooperating to confine fluid under pressure operating to urge said members axially apart, said first member being adapted to be connected to an aircraft, landing wheels operatively connected to said second member, a torque element disposed within said first member and axially fixed and rotatable on said first member, a connection between said torque element and second member permitting relative axial movement and preventing relative rotation therebetween, actuator means connected between said first member and torque element operable to rotate said torque element between two positions, and fixed stops on said first member and torque element engaging when said torque element is in one of said positions preventing rotation thereof in a direction away from the other of said positions.

3. An aircraft landing gear comprising first and second telescoping members axially movable and rotatable relative to each other, said members cooperating to confine fluid under pressure operating to urge said members axially apart, said first member being adapted to be connected to an aircraft, landing wheels operatively connected to said second member, a torque element disposed within said first member and axially fixed and rotatable on said first member, a connection between said torque element and second member permitting relative axial movement and preventing relative rotation therebetween, a folding locking toggle connected between said first member and torque element, and an actuator connected between said torque element and toggle operable to rotate said torque element between two positions, said toggle operating to lock said torque element in each of said positions.

4. An aircraft landing gear comprising first and second telescoping members axially movable and rotatable relative to each other, said members cooperating to confine fluid under pressure operating to urge said members axially apart, said first member being adapted to be connected to an aircraft, landing wheels operatively connected to said second member, a torque element disposed within said first member and axially fixed and rotatable on said first member, a connection between said torque element and second member permitting relative axial movement and preventing relative rotation therebetween, a foldable locking toggle connected between said torque element and first member, and actuator means operably connected to said torque element and toggle operable to rotate said torque element between two positions and lock said toggle in each of said positions.

5. An aircraft landing gear comprising first and second telescoping members axially movable and rotatable relative to each other, said members cooperating to confine fluid under pressure operating to urge said members axially apart, said first member being adapted to be connected to an aircraft, landing wheels operatively connected to said second member, a torque element disposed within said first member and axially fixed and rotatable on said first member, a connection between said torque element and second member permitting relative axial movement and preventing relative rotation therebetween, a foldable locking toggle connected between said torque element and first member, and a piston and cylinder actuator connected to said torque element and toggle operable to unlock said toggle and to rotate said torque element between two positions and lock said toggle in each of said positions.

6. An aircraft landing gear comprising first and second telescoping members axially movable and rotatable relative to each other, said first member being adapted to be connected to an aircraft, landing wheels operatively connected to said second member, a torque element disposed within said first member and axially fixed and rotatable on said first member, a connection between said torque element and second member permitting relative axial movement and preventing relative rotation therebetween, a foldable locking toggle connected between said torque element and first member, actuator means operably connected to said torque element and toggle operable to rotate said torque element between two positions and lock said toggle in each of said positions, and fixed stops on said first member and torque element engaging when said torque element is in one of said positions preventing rotation thereof only in a direction away from the other of said positions.

7. In combination an aircraft having a longitudinal axis; a pair of landing gears mounted on said aircraft with one on each side of said longitudinal axis; each landing gear including first and second telescoping members axially movable and rotatable relative to each other, said first member being connected to said aircraft, landing wheels operatively connected to said second member, a torque element disposed within said first member and axially fixed and rotatable on said first member, a connection between said torque element and second member permitting relative axial movement and preventing relative rotation therebetween, a foldable locking toggle connected between said torque element and first member, actuator means operably connected to said torque element and toggle operable to rotate said torque element between two positions and lock said toggle in each of said positions, and fixed stops on said first member and torque element engaging when said torque element is in one of said positions preventing rotation thereof only in a direction away from the other of said positions.

8. An aircraft landing gear comprising first and second telescoping members axially movable relative to each other, said first member being adapted to be connected to an aircraft, an axle beam mounted on said second member, landing wheels journalled on each end of said axle beam, a torque element disposed within said first member and axially fixed and rotatably mounted on said first member, a connection between said torque element and second member permitting relative axial movement and preventing relative rotation therebetween, a first link pivotally connected to said torque element, a second link pivotally connected at one end to said first link and at its other end to said first member, stop means on one of said links engageable with the other of said links to limit relative rotation beyond a substantially aligned locked position, and an actuator including piston and cylinder elements connected between one of said links and said torque element operable to rotate said torque element between two positions, said links being in said substantially aligned position when the torque element is in each of its two positions.

9. An aircraft landing gear comprising first and second telescoping members axially movable relative to each other, said first member being adapted to be connected to an aircraft, an axle beam mounted on said second member, landing wheels journalled on each end of said axle beam, a plunger tube extending into both of said members axially fixed and rotatably mounted on said first member, a splined connection between said plunger tube and second member permitting relative axial movement and preventing relative rotation therebetween, a first link pivotally connected to said plunger tube, a second link pivotally connected at one end to said first link and at its other end to said first member, stop means on one of said links engageable with the other of said links to limit relative rotation beyond a substantially aligned locked position, and an actuator including piston and cylinder elements connected between one of said links and said plunger tube operable to rotate said plunger tube between two positions, said links being in said substantially aligned position when the plunger tube is in each of its two positions.

10. An aircraft landing gear comprising first and second telescoping members axially movable relative to each other, said first member being adapted to be connected to an aircraft, an axle beam mounted on said second member, landing wheels journalled on each end of said axle beam, a plunger tube extending into both of said members axially fixed and rotatably mounted on said first member, a splined connection between said plunger tube and second member permitting relative axial movement and preventing relative rotation therebetween, a first link pivotally connected to said plunger tube, a second link pivotally connected at one end to said first link and at its other end to said first member, stop means on one of said links engageable with the other of said links to limit relative rotation beyond a substantially aligned locked position, an actuator including piston and cylinder elements connected between one of said links and said plunger tube operable to rotate said plunger tube between two positions, said links being in said substantially aligned position when the plunger tube is in each of its two positions, and fixed stops on said first member and plunger tube engaging when said plunger tube is in one of said two positions preventing rotation thereof only in a direction away from the other of said two positions.

References Cited in the file of this patent

UNITED STATES PATENTS

| | | |
|---|---|---|
| 2,222,683 | Overbeke | Nov. 26, 1940 |
| 2,291,571 | Cleveland | July 28, 1942 |
| 2,367,993 | Bishop | Jan. 23, 1945 |
| 2,371,699 | Martin | Mar. 20, 1945 |
| 2,557,274 | Geisse | June 19, 1951 |
| 2,659,555 | Schlender | Nov. 17, 1953 |
| 2,906,474 | Cravero | Sept. 29, 1959 |
| 2,943,498 | Smith | July 5, 1960 |